United States Patent [19]

Kinoshita et al.

[11] Patent Number: 5,170,262

[45] Date of Patent: Dec. 8, 1992

[54] ELECTRONIC CAMERA

[75] Inventors: Takao Kinoshita; Yoshiyuki Takishima, both of Kawasaki, Japan

[73] Assignee: Canon Kabushiki Kaisha, Tokyo, Japan

[21] Appl. No.: 653,998

[22] Filed: Feb. 13, 1991

Related U.S. Application Data

[63] Continuation of Ser. No. 377,797, Jul. 10, 1989, abandoned, which is a continuation of Ser. No. 53,395, filed as PCT/JP86/00478, Sep. 13, 1986, abandoned.

[30] Foreign Application Priority Data

Sep. 13, 1985 [JP] Japan .................. 60-201744

[51] Int. Cl.⁵ .............................................. H04N 5/76
[52] U.S. Cl. .................................... 358/335; 358/906
[58] Field of Search ............... 360/33.1, 35.1; 358/335, 906, 909

[56] References Cited

U.S. PATENT DOCUMENTS

| | | | |
|---|---|---|---|
| 4,057,830 | 11/1977 | Adcock | 358/906 |
| 4,130,834 | 12/1978 | Mender et al. | 358/906 |
| 4,232,329 | 11/1980 | Horak | 358/906 |
| 4,262,301 | 4/1981 | Erlichman | 358/906 |
| 4,263,623 | 4/1981 | Woo et al. | 358/906 |
| 4,420,773 | 12/1983 | Toyoda et al. | 358/335 |
| 4,456,931 | 6/1984 | Toyoda et al. | 358/335 |
| 4,507,689 | 3/1985 | Kozuki et al. | 360/33.1 |
| 4,527,205 | 7/1985 | Konishi | 358/906 |
| 4,541,010 | 9/1985 | Alston | 358/906 |
| 4,599,657 | 7/1986 | Kinoshita et al. | 358/906 |
| 4,604,668 | 8/1986 | Lemelson . | |
| 4,647,976 | 3/1987 | Nakagaki et al. | 358/335 |
| 4,691,253 | 9/1987 | Silver | 358/335 |
| 4,691,253 | 9/1987 | Silver . | |
| 4,695,905 | 9/1987 | Utsugi | 358/335 |
| 4,758,883 | 7/1988 | Kawahara et al. | 360/35.1 |
| 4,814,876 | 3/1989 | Horio et al. | 358/906 |
| 4,897,732 | 1/1990 | Kinoshita et al. | 358/906 |
| 4,901,160 | 2/1990 | Kinoshita et al. | 358/906 |

FOREIGN PATENT DOCUMENTS

| | | |
|---|---|---|
| 57-44374 | 3/1982 | Japan . |
| 58-182964 | 10/1983 | Japan . |
| 58-21800 | 12/1983 | Japan . |

OTHER PUBLICATIONS

Japanese Article, pp. 19–23, Nov. 1983.

*Primary Examiner*—Donald McElheny, Jr.
*Attorney, Agent, or Firm*—Fitzpatrick, Cella, Harper & Scinto

[57] ABSTRACT

An electronic camera electronically records an optical image by using a non solid-state memory and includes an image pickup element, an image pickup section, and an external recording section. The image pickup section includes a solid-state memory means for digital-recording at least one-frame image signals supplied from the image pickup element. The external recording section includes a non solid-state memory means, and a D/A converter for analog-recording a digital image signal supplied from the image pickup section on the non solid-state memory means. The image pickup section and the external recording section are detachable.

14 Claims, 9 Drawing Sheets

$V_O$(VERTICAL SYNC)

ELECTRONIC CAMERA

This application is a continuation of application Ser. No. 07/377,797, filed Jul. 10, 1989, now abandoned, which is a continuation of application Ser. No. 053,395, filed as PCT/JP86/00478, Sep. 13, 1986, now abandoned.

FIELD OF INDUSTRIAL APPLICATION

The present invention relates to an electronic camera, that is, a camera for electronically recording an optical image and, more particularly, to an electronic camera having a recording section using a non solid-state memory, such as a disk, as a recording

PRIOR ART

A conventional electronic camera of this type consists of an image pickup section for converting an optical image into an electrical signal and a disk recording section for electronically or magnetically recording the electrical signal.

Alternatively, an electronic camera of this type has a solid-state memory, instead of a disk recording section,, as the recording means, in order to eliminate drawbacks.

PROBLEMS TO BE SOLVED BY THE INVENTION

However, the prior art as described above has the following drawbacks.

First, an electronic camera having a disk recording section as a recording means has the following drawbacks:

(1) Since a recording disk and a disk drive for driving the same have predetermined sizes, miniaturization of the entire camera is limited.

(2) A predetermined time interval is required for the rise time of disk rotation when recording of an image is started, and a shutter release opportunity can be lost.

(3) A power consumption required for a disk servo mechanism is comparatively large, and the disk servo mechanism time not contributing to recording is prolonged.

(4) The camera housing must be water- and dust-proof for the necessity of disk change, resulting in a high cost.

Meanwhile, an electronic camera using a solid-state memory as a recording means has the following drawbacks:

(1) It is difficult to increase the memory capacity exceeding a predetermined degree, and the maximum number of photographing frames is smaller than that of an electronic camera which uses a disk.

(2) Since cost reduction of the memory is limited, reduction in photographing cost is also limited.

(3) A semiconductor memory requires power to maintain data of a recorded optical image, and it is difficult to reserve it permanently.

(4) If a replaceable memory pack is used to overcome the problem of the limited maximum number of photographing frames, the camera housing must be water- and dust-proof, resulting in a high cost.

Means for Solving the Problems

Therefore, according to the present invention, an image pickup section including an image pickup element and a solid-state memory means for recording at least one-frame image signals from the image pickup element, and an external recording section including a non solid-state memory means are provided separately, and the image pickup section and the external recording section are detachable. A D/A converter is provided in the external recording section in order to analog-record a digital image signal supplied from the image pickup section on the non solid-state memory means.

Embodiments of the present invention will be described in detail with reference to the accompanying drawings.

Figure 1:
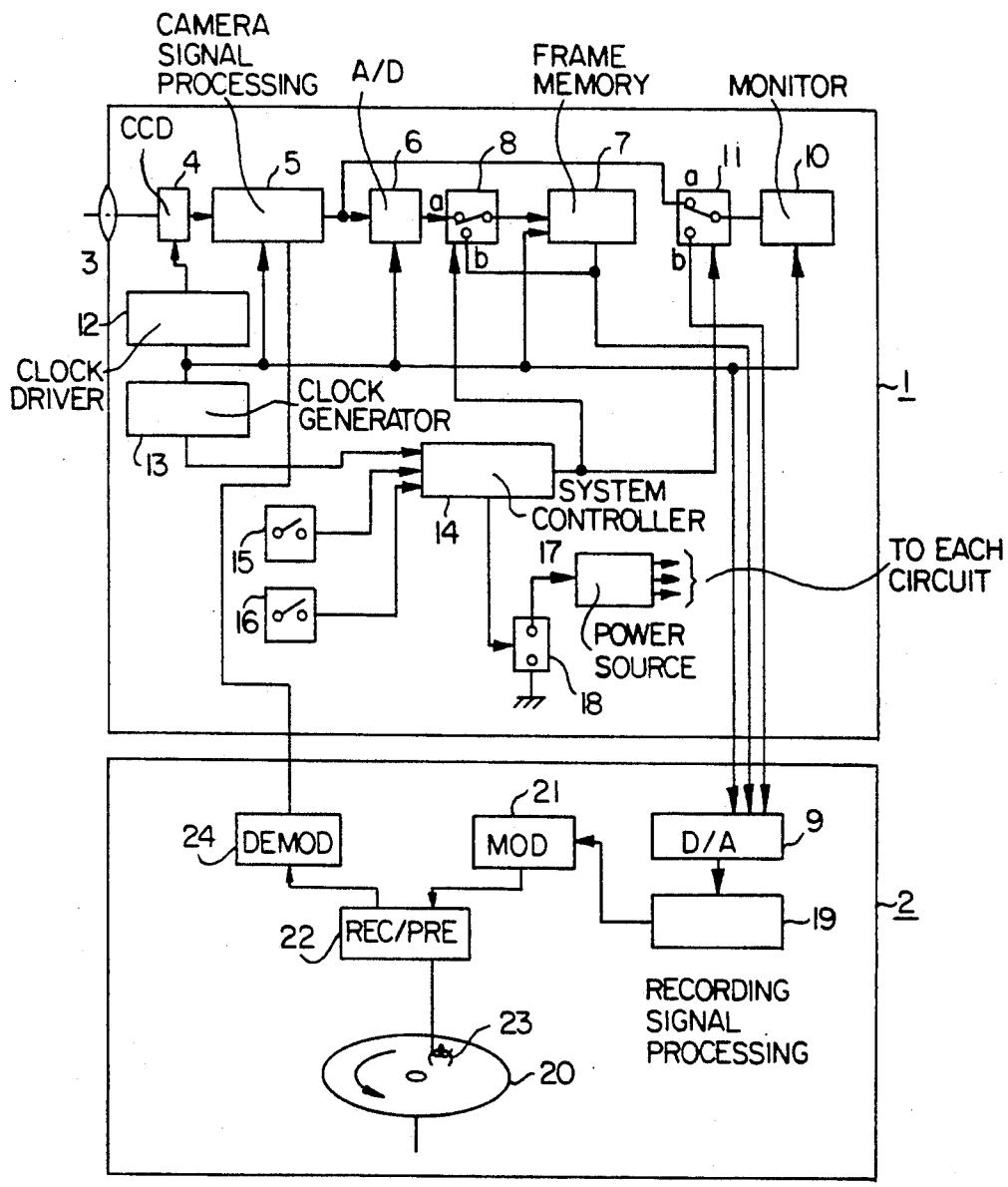
FIG. 1 is a block diagram of a first embodiment of the present invention.

FIG. 1 is a block diagram of an arrangement of an electronic camera according to an embodiment of the present invention.

The electronic camera of this embodiment basically consists of an image pickup section 1 and disk recording section 2.

The image pickup section 1 has a lens 3 and an image pickup element 4. The image pickup element 4 forms an optical image from the lens 3 and converts the optical image into an electrical signal, i.e., an image signal. The image pickup element 4 comprises a known image pickup means such as a CCD, a MOS, an image pickup tube and so on. A signal processing circuit 5 processes the image signal from the image pickup element.

The image pickup section 1 also has an A/D converter 6 and a frame memory 7 for storing one-frame digital image signals supplied from the A/D converter. The frame memory 7 can be a field memory if needed. A nonvolatile DRAM is suitable as the frame memory 7. Therefore, a selection switch 8 is provided between the A/D converter 6 and the frame memory 7. When the frame memory 7 sequentially records incoming image signals, a contact a of the selection switch 8 is turned on. When a recording signal must be maintained, a contact b of the selection switch 8 is turned on. A recording signal is switched in this manner.

A D/A converter 9 converts a digital image signal read out from the frame memory 7, provided in the disk recording section 2, into an analog signal.

A monitor 10 displays an image signal as a visual image.

A second selection switch 11 is also provided. When a contact a of the second selection switch 11 is turned on, raw image signals obtained by the image pickup element 4 and sequentially supplied via the signal processing circuit 5 are supplied to the monitor 10 and displayed on it. In this case, the monitor 10 serves as a finder of the camera.

On the other hand, when a contact b of the second selection switch 11 is turned on, the image signal of the frame memory 7 is supplied to the monitor 10 via the D/A converter 9 and displayed on the monitor 10.

A clock driver 12 supplies a clock pulse from a clock generator 13 to the image pickup element 4, the signal processing circuit 5, the A/D converter 6, the frame memory 7, the D/A converter 9, the monitor 10, and so on. The respective units of the image pickup section 1 are driven in accordance with the clock pulse.

A system controller 14 controls switching of the contacts of the selection switch 8 and the second selection switch 11 in accordance with the timing obtained by a release switch 15. The system controller 14 is also driven by a clock from the clock generator 13.

A main switch 16 controls start/stop of the system controller.

A power source 17 and a power source switch 18 are provided. Power from the power source 17 is supplied to the respective units of the image pickup section 1 and the disk recording section 2.

The disk recording section 2 has a recording signal processing circuit 19. The recording signal processing circuit 19 performs signal processing in order to supply an analog signal, obtained by converting an image signal on the frame memory 7 by the D/A converter 9, to a recording disk to be described later.

The disk recording section 2 has a recording disk 20. The recording disk 20 uses a magnetic sheet as a disk medium. Another medium such as an optical recording medium and a photomagnetic recording medium can also be used.

An FM modulator 21 modulates an analog image signal from the D/A converter 9 into an FM signal and supplies the FM signal to the recording disk 20 when a recording disk is used as a magnetic medium.

A recording/reproduction amplifier 22 is used to amplify a signal when the signal is to be recorded on the magnetic disk 20 or when a signal described later is reproduced.

A recording/reproduction head 23 is used to record and reproduce a signal on and from the recording disk 20.

An FM demodulator 24 demodulates an FM reproduction signal supplied from the recording/reproduction amplifier 22. An analog image signal output from the FM demodulator 24 is supplied to the camera signal processing circuit 5 of the image pickup section 1. Therefore, the signal reproduced from the recording disk 20 can be displayed on the monitor 10 in the same manner as an image signal from the image pickup element 4.

Figure 4:
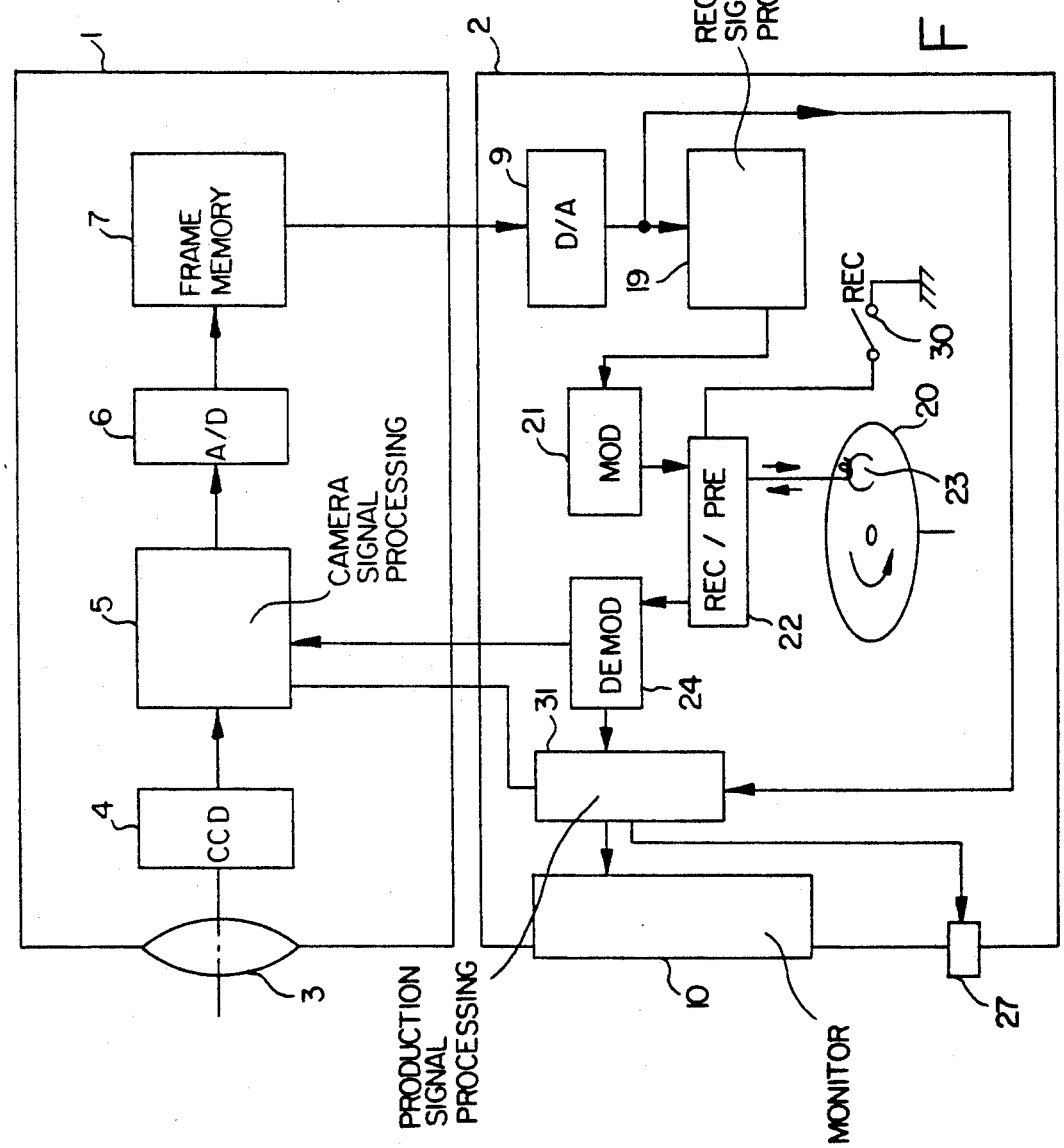
FIG. 4 is a block diagram of a second embodiment of the present invention.

FIG. 4 shows the outer appearance of the electronic camera of the present invention. The same reference numerals are used to denote the same portions as in the block diagram of FIG. 1.

Figure 2:
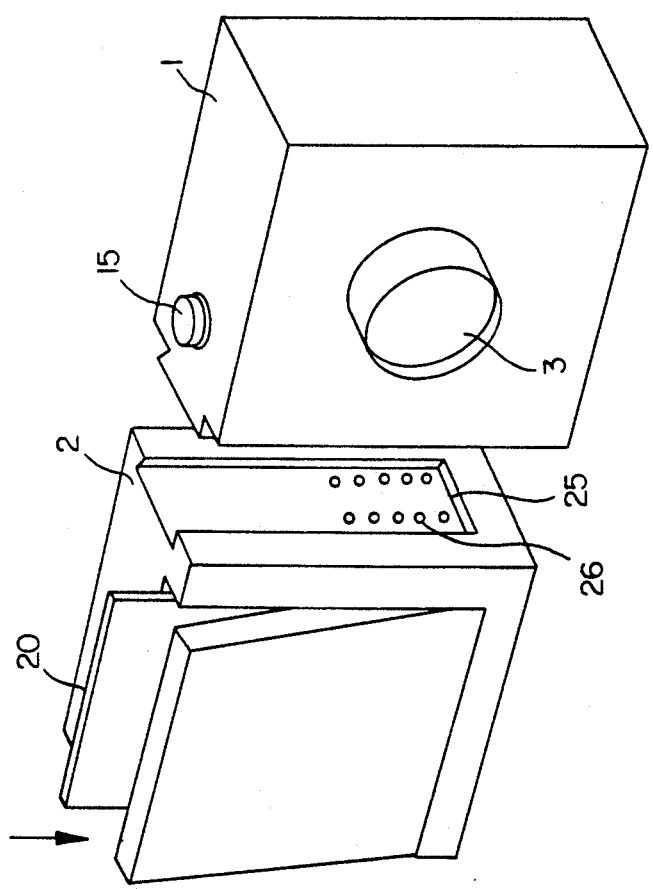
FIG. 2 shows an outer appearance of the same.

Referring to FIG. 2, a joint 25 includes a contact group 26 for electrically connecting the image pickup section 1 and the disk recording section 2.

With the above arrangement, the electronic camera of the present invention operates in the following manner.

The operation of the camera of the present invention will be described with reference to the flow chart shown in FIG. 3(a)

In step #1, the main switch 16 is turned on, and the system controller 14 is enabled.

In step #2, the power source switch 18 is turned on, and the contacts a of the selection switch 8 and the second selection switch 11 are turned on. In this step, power is supplied from the power source 17 to the respective portions to actuate them.

In this case, when an external optical image is projected on the image pickup element 4 through the lens 3, the image is converted into an electrical image signal, and the image signal is supplied to the monitor 10 through the contact a of the second selection switch 11 and displayed on the screen of the monitor 10. In other words, in this step the monitor 10 serves as the finder of the camera.

Meanwhile, the system controller 14 generates a sync signal by a clock signal supplied from the clock generator 13. A vertical sync signal VD is generated every one frame period V, as shown in FIG. 3(b).

When the frame memory 7 is a field memory, the vertical sync signal VD is generated at a period of ½ V.

Then, the flow advances to step #3 to turn on the release switch 15. The system controller 14 is driven and the vertical sync signal VD is supplied to the selection switch 8 and the second selection switch 11. When the vertical sync signal VD falls (step #4), the selection switch 8 and the second selection switch 11 are switched to their contacts b (step #5). Then, the signal data on the frame memory 7 is connected through the contacts b, the image is fixed, and a so-called image freeze state is obtained. The frozen image is supplied to the monitor 10 through the contact b of the second selection switch 11 and displayed on it.

At the same time, the frozen image is also supplied to the disk recording section 2 through the D/A converter 9. The one-frame frozen image is recorded on the recording disk 20.

In this case, an image signal is temporarily stored in the frame memory 7 and then transferred to the recording disk 20. Therefore, time-base correction is performed.

When a next image is to be picked up, the release switch 15 is depressed again (step #6), and the flow returns to the state after step #1. When the release switch 15 is turned on again, the operations as described above are sequentially performed, and the next image is recorded on the recording disk 20.

Since the image signals on the frame memory 7 are sequentially transferred on the recording disk, the number of photographing frames of the image pickup section 1 is sequentially increased.

The frame memory 7 has a small memory capacity of a limited frame number. However, if the memory capacity is greatly increased in the near future, images of several tens of frames or more can be recorded.

In this case, when the remaining number of the possible recording frames of the frame memory 7 becomes small, an alarm signal is generated.

In the camera of this embodiment, since an image recorded on the recording disk 23 can also be displayed on the monitor 10 via the signal processing circuit 5, an image once stored in the recording disk 23 can be visually observed.

In this embodiment, the electronic camera has the separate image pickup section 1 and disk recording section 2, as described above. After an image signal is temporarily stored in the frame memory 7, the image signal is transferred to the disk recording section 2. Therefore, a shutter release opportunity may not be lost due to a delay in starting timing of the recording disk 23. The image pickup section 1 can be made small and lightweight. When peak power is decreased to decrease the power source load on the image pickup section 1, a signal is read out from the image pickup element 4 at a low speed and temporarily stored in the frame memory 7. Therefore, the number of photographing frames can be increased over the number in a conventional electronic camera even with a cell of the same capacity. Once an image is stored in the frame memory, the image pickup section 1 is connected to the disk recording section 2, and the image can be transferred from the frame memory 7 and can be reproduced and displayed on the monitor 10 through the D/A converter 9. When a given image is an unnecessary image, the corresponding memory area of the recording disk 20 can store a new image.

FIG. 4 shows a second embodiment of the present invention. In FIG. 4, the portions denoted with the same reference numerals as in FIG. 1 operate in the same manner as the first embodiment and a detailed description therefor is omitted. Some necessary circuits shown in detail in FIG. 1 are not shown in FIG. 4. However, an image pickup section 1 has the same arrangement and operation as those of the first embodiment.

Figure 5:
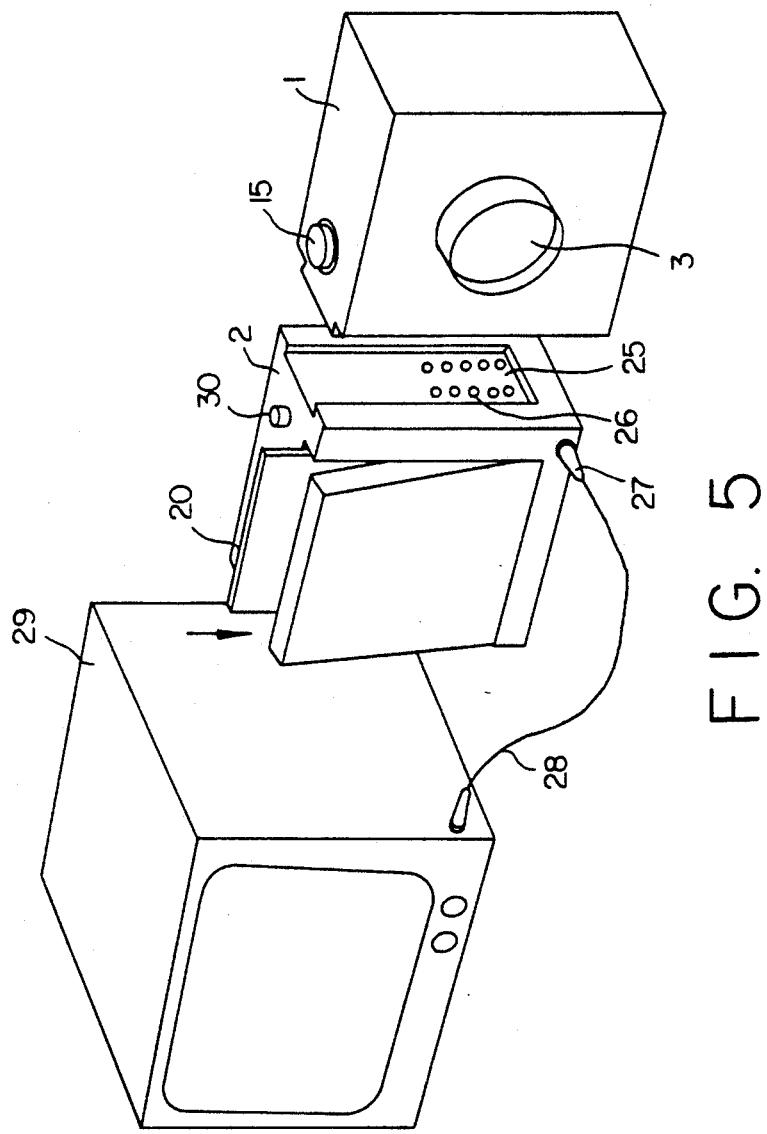
FIG. 5 shows an outer appearance of the same.

FIG. 5 shows the outer appearance of the second embodiment. Referring to FIGS. 4 and 5, the apparatus has an output terminal 27 for supplying an image signal to outside the pick up, through a cable 28; the image signal can be displayed on the monitor 10 and on a television monitor 29.

A switch 30 controls the start of a recording/reproduction amplifier 22. The switch 30 is used to determine whether an image in a frame memory 7 of the image pickup section 1 is recorded on a disk 23. When the switch 30 is lightly depressed, a current image is not recorded on the disk 23 but a next image in the frame memory 7 is transferred. When the switch 30 is strongly depressed, a current image on the frame memory 7 is transferred, and both the frame memory 7 and a recording disk 20 can record a new image. The operation is performed in this manner.

When the image pickup section 1 and the disk recording section 2 are connected, the content of the frame memory 7 of the image pickup section can be automatically and sequentially transferred at once. In this case, it is easy to increase the number of recording frames of the frame memory 7 and to display these frames. The connection of the image pickup section 1 and the disk recording section 2 is shown. They can be connected through a wire or without a wire.

In this embodiment, the monitor 10 is provided to the disk recording section 2.

A reproduction signal processing circuit 31 receives a reproduction signal from an FM demodulator 24, an image signal in the frame memory 7 is supplied from a D/A converter 9, and an input image signal is supplied from an image pickup element 4 through a signal processing circuit 5, and supplies them to the monitor 10 and the output terminal 27.

A third embodiment of the present invention will be described with reference to FIGS. 6 and 7.

Figure 6:
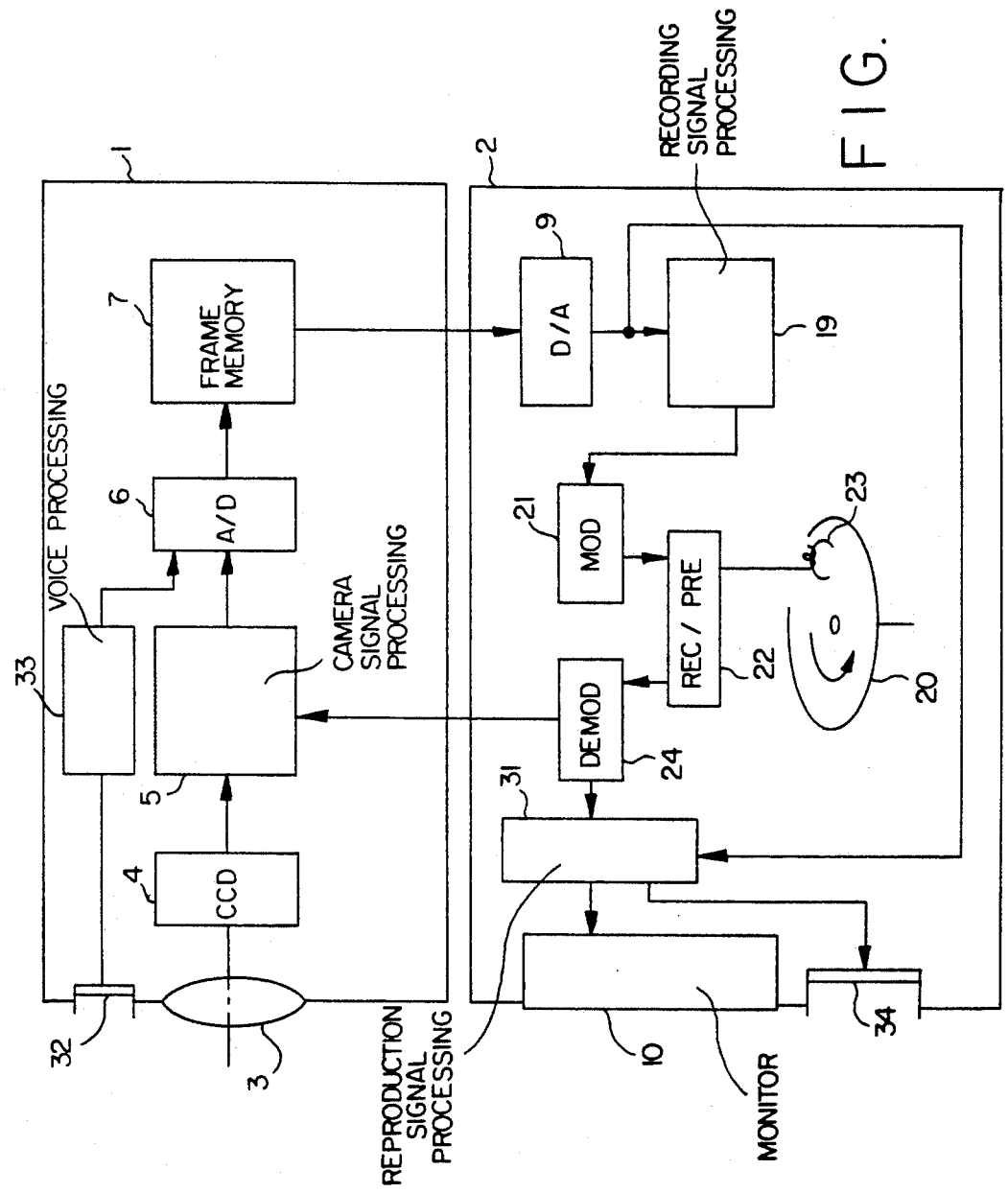
FIG. 6 is a third embodiment of the present invention.
Figure 7:
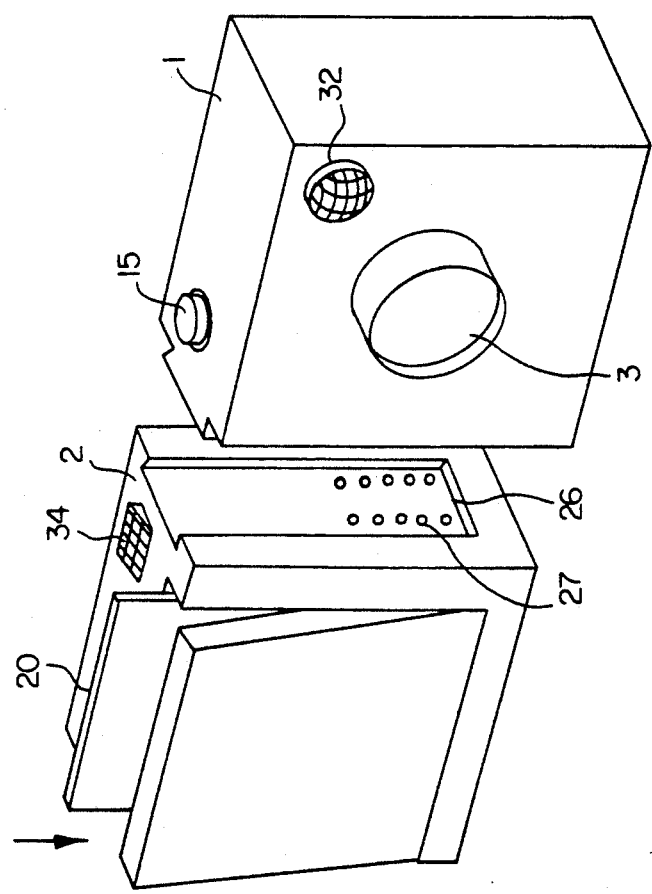
FIG. 7 shows an outer appearance of the same.

In FIGS. 6 and 7, the portions denoted with the same reference numerals as the first embodiment are identical to those therein, and the detailed description therefor is omitted.

FIG. 6 is a block diagram of the third embodiment, and FIG. 7 shows the outer appearance of the same.

Referring to FIGS. 6 and 7, a microphone 32 and a voice processing circuit 33 are provided. The voice processing circuit 33 processes a voice signal from the microphone 32 by time base compression or the like.

A loudspeaker 34 reproduces a voice signal. In this embodiment, a voice signal as well as an image signal can be recorded.

More specifically, a voice signal picked up by the microphone 32 is time-base compressed by the voice processing circuit 33 into a time-base compression voice signal having the same frequency band as that of an image signal supplied from an image pickup element 4.

A time-base compression voice signal is short and has the same data amount as that of a longer voice signal. This signal is converted into a digital signal by an A/D converter 6 and recorded in a frame memory 7.

The time-base compression signal is then transferred onto a recording disk 20 in the same manner as for an image signal.

When a signal is reproduced, it is derived as a time-base compression voice signal by an FM demodulator 24 in the same manner as an image signal, time-base expanded to a voice signal of a normal frequency band and having a normal time length by a reproduction signal processing circuit 31, and reproduced by the loudspeaker 34.

The microphone 32 and a monitor 10 can be provided to one or both of an image pickup section 1 or a disk recording section 2.

A fourth embodiment of the present invention will be described with reference to FIGS. 8 and 9.

Figure 8:
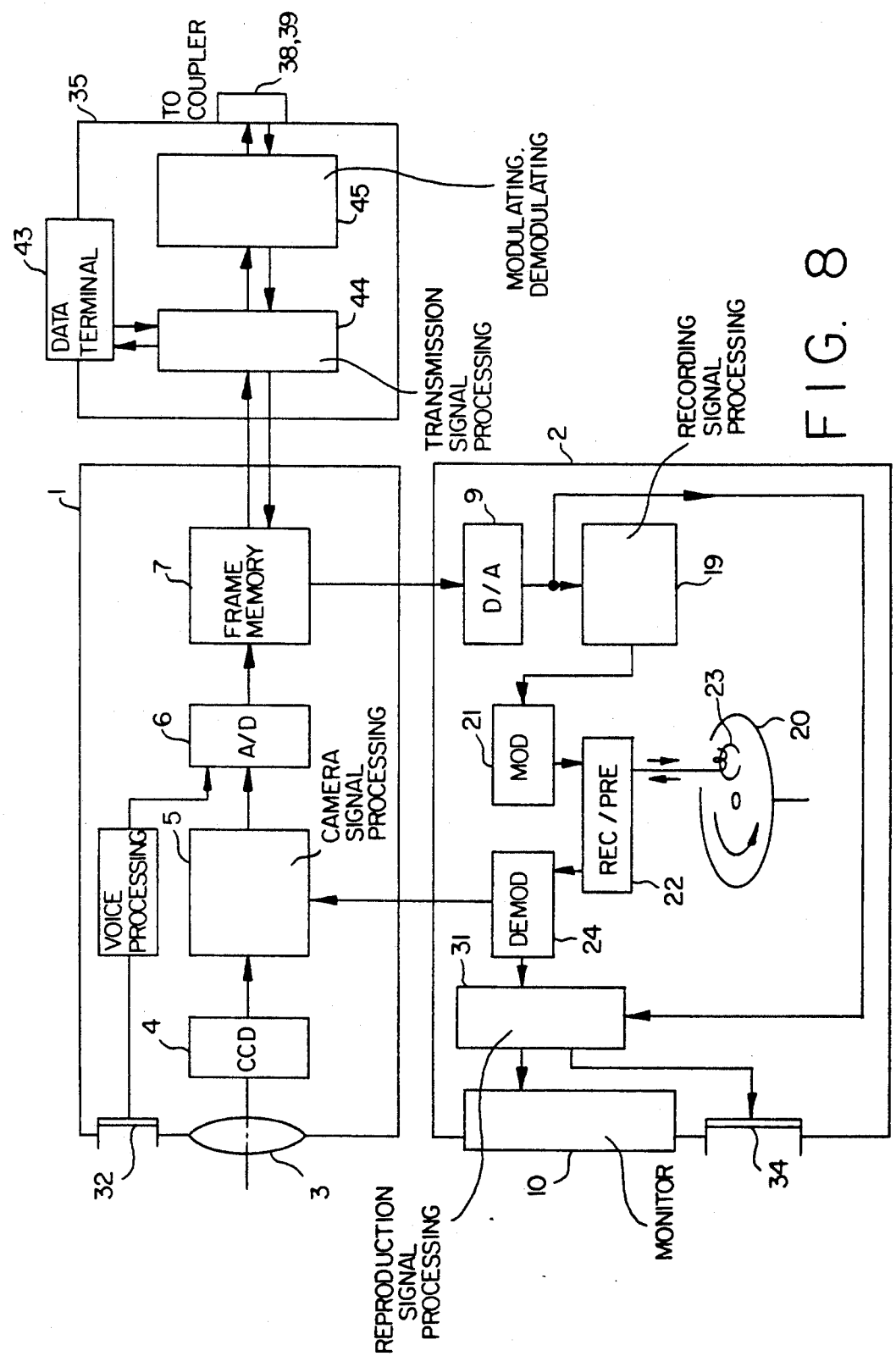
FIG. 8 is a block diagram of a fourth embodiment of the present invention.
Figure 9:
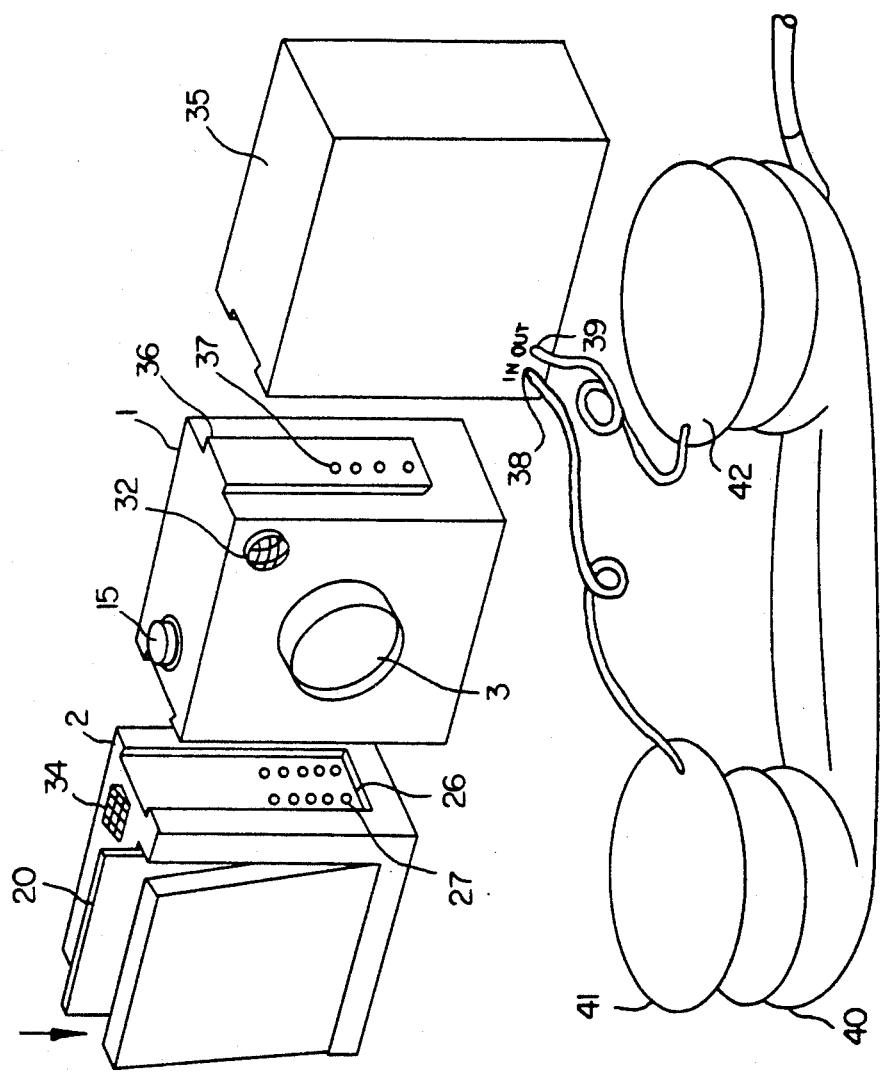
FIG. 9 shows an outer appearance of the same.

FIG. 8 is a block diagram of the fourth embodiment, and FIG. 9 shows the outer appearance of the same. The portions denoted by the same reference numerals are identical to those of other embodiments, and a detailed description therefor is omitted.

A telephone transmission section 35 is provided. A member 36 connects an image pickup section 1 and the telephone transmission section 35. A contact group 37 performs electrical connection.

Terminals 38 and 39 serve as interfaces with a receiver 40 of a telephone set and are connected to voice couplers 41 and 42 opposing the receiver 40.

The telephone transmission section 35 has a data input/output terminal 43. Therefore, a frame memory 7 can be controlled through a transmission signal processing circuit 44, and data of an image signal in the frame memory 7 can be output. The terminal 43 can be a general microcomputer terminal and can be coupled to a microcomputer display, a printer, a disk memory and so on with a known method.

A voice signal from a microphone 32, an image signal from an image pickup element 4, and an image signal and a time-base compression voice signal recorded in the frame memory 7 are modulated by a modulator/demodulator 45 through the transmission signal processing circuit 44, and converted into a carrier which is transmitted via a telephone line through the terminals 38 and 39.

Similarly, when an image signal and a voice signal obtained and picked up at another time are transmitted through the telephone line, they are input through the terminals 38 and 39, are demodulated by the modulator/demodulator 45 to have the base band, and reach the image pickup section 1 through the transmission signal processing circuit 44. In the image pickup section 1, the signals are transferred on the frame memory 7 and recorded and displayed in the same manner as described above.

In the above embodiment, the image pickup section 1 and the telephone transmission section 35 are connected. However, the same effect can be obtained when a disk recording section 2 and the telephone transmission section 35 are connected.

Note that a solid-state memory performs data accessing for recording/reproduction in a non-mechanical manner and includes a magnetic bubble memory or the like.

A non solid-state memory performs data accessing for recording/reproduction in a mechanical manner and includes a VTR or the like.

Effects

As described above, according to the present invention, since an image pickup section having a solid-state memory and a disk recording section having a non solid-state memory are separated, the following effects can be obtained:

(1) A camera for picking up an optical image, i.e., an image pickup section can be made small.

(2) Since the non solid-state memory such as a disk is not driven for photographing, a photographing timing is not delayed, i.e., a shutter release opportunity is not lost.

(3) Since the non solid-state memory such as a disk is not driven for photographing, power consumption can be reduced.

(4) The camera housing can be easily made water- and dust-proof.

(5) Photographing; reproduction, dubbling, and filing of an image or voice; and monitoring of the respective operation steps can be easily performed.

(6) The entire system can be easily extended for voice recording, telephone transmission, and data recording.

What is claimed is:

1. An electronic camera system comprising:
   (a) an image pickup section outputting digital signals and including:
   an image pickup element;
   an A/D converter for converting analog signals outputted from said image pickup element into digital signals;
   solid-state memory means, integral with said image pickup section and having a storage capacity and a first rising time which is required to start recording, for digitally recording at least one frame of digital image signals supplied from said image pickup element; and
   output means for outputting the digital signals recorded in said solid-state integral memory means; and
   (b) an external recording section including:
   a D/A converter for converting input digital signals into analog signals; and
   analog memory means, having a storage capacity larger than said solid-state integral memory means and having a second rising time longer than said first rising time, for storing the analog signals corresponding to the digital signals output by said image pickup section output means;
   wherein said external recording section is removably mounted on said image pickup section; and
   wherein said D/A converter converts the digital signals supplied from said image pickup section output means into the analog signal to be stored in said analog memory means.

2. An electronic camera system according to claim 1, wherein said external recording section further comprises monitor means.

3. An electronic camera system according to claim 1, further comprising control means for causing said solid-state integral means to temporarily store the digital image signal, in order to permit corrections of the digital image signal on a time base, and then to transfer the digital image signal to said external recording section through said output means.

4. An electronic camera system according to claim 1, wherein when said image pickup section and said external recording section are connected to each other, the content of said solid-state integral memory means is automatically transferred to said external recording section.

5. An electronic camera system according to claim 1, wherein said image pickup section displays the number of possible recording frames upon transfer of the content of said solid-state integral memory means to said external recording section.

6. An electronic camera system according to claim 1, wherein said image pickup section generates an alarm when the number of recording frames of said solid-state integral memory means has reached a predetermined-value.

7. An electronic camera system according to claim 1, wherein said image pickup section and said external recording section are connected by wiring means.

8. An electronic camera system according to claim 1, wherein said image pickup section and said external recording section are connected by wireless means.

9. An electronic still camera system comprising:
   (a) a portable image pickup device outputting digital signals and including:
   an image pickup element; and
   an A/D converter for converting analog signals outputted from said image pickup element into digital signals;
   recording means for temporarily recording digital image signals produced in said A/D converter, said recording means having a rising time which is required to start recording and a storing capacity; and
   (b) a recording device, detachably mounted to said image pickup device and including a D/A converter which converts the digital signals output from said portable image pickup device into analog image signals for recording said analog image signals corresponding to the received digital signals, said recording device having a longer rising time and a larger storing capacity than said recording means.

10. An electronic still camera system according to claim 9, wherein said recording means includes a digital memory.

11. An electronic still camera system according to claim 10, wherein said image pickup device includes output means for outputting from said image pickup device an output of said recording means as a digital signal.

12. An electronic still camera system according to claim 9, wherein said detachable recording device includes an analog memory for recording the analog signal converted by said converter.

13. An electronic still camera system according to claim 9, wherein said image pickup device includes monitor means for visually monitoring said image signals.

14. An electronic still camera system according to claim 9, wherein said detachable recording device includes monitor means for visually monitoring said image signals.

* * * * *

UNITED STATES PATENT AND TRADEMARK OFFICE
CERTIFICATE OF CORRECTION

PATENT NO. : 5,170,262
DATED : December 8, 1992
INVENTOR(S) : KINOSHITA ET AL.

It is certified that error appears in the above-identified patent and that said Letters Patent is hereby corrected as shown below:

Column 1

Line 14, "recording" should read --recording means.--.
Line 23, "section,," should read --section,--.
Line 24, "eliminate draw-" should read --eliminate its draw- --.
Line 40, "A" should read --The--.
Line 58, "reserve" should read --preserve--.

Column 3

Figure 3A:
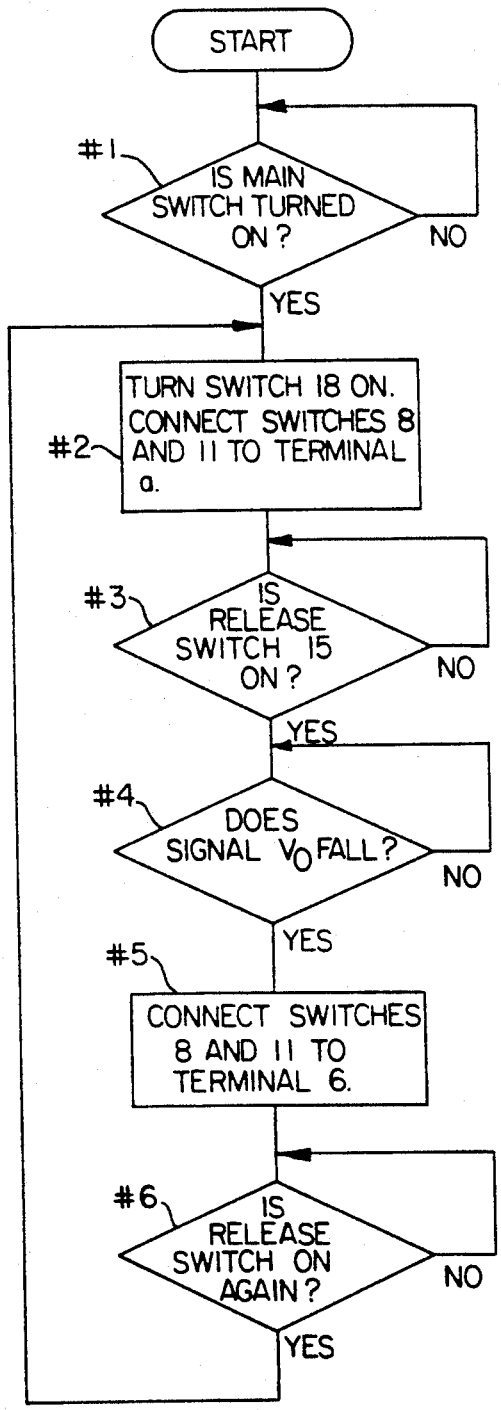
FIG. 3 shows a flow chart and a waveform chart of the operation of the first embodiment.
Figure 3B:
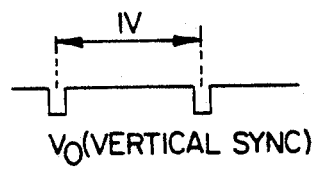

Line 61, "FIG. 3(a)" should read --FIG 3(a).--.

Column 7

Line 27, "dubbling," should read --dubbing--.

Column 8

Line 1, "integral means" should read --integral memory means--.

Signed and Sealed this

Twenty-third Day of November, 1993

Attest:

BRUCE LEHMAN

Attesting Officer          Commissioner of Patents and Trademarks